United States Patent
Kazami et al.

(10) Patent No.: US 12,142,064 B1
(45) Date of Patent: Nov. 12, 2024

(54) CHARACTER RECOGNITION DEVICE, CHARACTER RECOGNITION METHOD, CHARACTER RECOGNITION SYSTEM

(71) Applicant: PANASONIC INTELLECTUAL PROPERTY MANAGEMENT CO., LTD., Osaka (JP)

(72) Inventors: Fukino Kazami, Tokyo (JP); Takaaki Idera, Kanagawa (JP); Yutaka Ikeda, Kanagawa (JP); Takefumi Takagi, Kanagawa (JP); Miki Shimizu, Kanagawa (JP); Fumiaki Taguchi, Kanagawa (JP); Kei Takamatsu, Kanagawa (JP); Akira Hagihara, Kanagawa (JP); Kazuki Kitada, Kanagawa (JP); Hiroki Teshima, Kanagawa (JP); Takaaki Moriyama, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/398,733

(22) Filed: Dec. 28, 2023

(30) Foreign Application Priority Data

Jul. 31, 2023 (JP) ................. 2023-124762

(51) Int. Cl.
*G06V 30/148* (2022.01)
*G06V 20/62* (2022.01)

(52) U.S. Cl.
CPC .......... *G06V 20/625* (2022.01); *G06V 30/153* (2022.01)

(58) Field of Classification Search
CPC ............... G06V 20/625; G06V 30/153
See application file for complete search history.

(56) References Cited

U.S. PATENT DOCUMENTS

| | | | |
|---|---|---|---|
| 9,727,804 B1 * | 8/2017 | Lapointe | G06Q 30/0206 |
| 11,562,583 B1 | 1/2023 | Zaidi et al. | |
| 2006/0123051 A1 * | 6/2006 | Hofman | G06V 30/244 |
| 2008/0212837 A1 | 9/2008 | Matsumoto et al. | |

(Continued)

FOREIGN PATENT DOCUMENTS

| | | | |
|---|---|---|---|
| CA | 3207568 A1 * | 8/2022 | G06K 9/00785 |
| CN | 109615910 A * | 4/2019 | |

(Continued)

OTHER PUBLICATIONS

CN 109615910 translation (Year: 2019).*

(Continued)

*Primary Examiner* — Carol Wang
(74) *Attorney, Agent, or Firm* — GREENBLUM & BERNSTEIN, P.L.C.

(57) ABSTRACT

A character recognition device includes a recognizer that recognizes at least one character string from an image including a trailer captured by an imaging device, and a selector. The selector selects character strings conforming to a specified notation format among the character strings recognized by the recognizer as candidates of a trailer ID/container ID, and that selects one of the candidates of the trailer ID/container ID, which has a similarity to master data of a previously held trailer ID/container ID equal to or larger than a predetermined threshold value as the trailer ID/container ID.

11 Claims, 7 Drawing Sheets

(56) References Cited

U.S. PATENT DOCUMENTS

2009/0180683 A1* 7/2009 Lee .................. G06V 30/1918
714/E11.002
2014/0009612 A1* 1/2014 King .................. G06Q 10/087
348/143
2014/0355836 A1* 12/2014 Kozitsky ................ G06V 20/63
382/105

FOREIGN PATENT DOCUMENTS

| CN | 110942073 A | * | 3/2020 | |
|---|---|---|---|---|
| CN | 112560551 A | * | 3/2021 | |
| EP | 0862132 A2 | * | 9/1998 | |
| JP | 2000-322685 | | 11/2000 | |
| JP | 2004107031 A | * | 4/2004 | |
| JP | 2008-217347 | | 9/2008 | |
| JP | 2009-098867 | | 5/2009 | |
| JP | 2018147178 A | * | 9/2018 | |
| KR | 100756008 B1 | * | 9/2007 | |
| KR | 102019036 B1 | * | 9/2019 | |
| WO | WO-2006006149 A2 | * | 1/2006 | ......... G06K 9/00973 |

OTHER PUBLICATIONS

CN 110942073 translation (Year: 2020).*
Official Action issued in Japanese patent application 2023-124762 dated Oct. 3, 2023, along with English translation thereof.
Official Action issued in Japanese patent application 2023-124762 dated Dec. 5, 2023, along with English translation thereof.

\* cited by examiner

FIG. 5

| PROCESSING AND FILTER | CONTENTS OF PROCESSING AND FILTER |
|---|---|
| CORRECTION | DELETE HYPHEN<br>DELETE CHARACTER OR NUMBER AT END OF IMAGE<br>CONVERT CHARACTER OR NUMBER THAT IS LIKELY TO BE ERRONEOUSLY RECOGNIZED |
| EXCLUSION FILTER | EXCLUDE CHARACTER STRING HAVING RELIABILITY SCORE EQUAL TO OR LESS THAN PREDETERMINED THRESHOLD VALUE<br>EXCLUDE CHARACTER STRING CONSISTING OF ONLY ALPHABETIC CHARACTERS<br>EXCLUDE CHARACTER STRING INCLUDING SPECIFIC ALPHABETIC CHARACTER AT HEAD<br>EXCLUDE CHARACTER STRING WHICH IS LESS THAN PREDETERMINED NUMBER OF CHARACTERS<br>EXCLUDE RESULT OF ERRONEOUS RECOGNITION OF PATTERN OR THE LIKE |
| PRIORITY FILTER | SELECT CANDIDATE OF TRAILER ID / CONTAINER ID BASED ON NOTATION FORMAT<br>SELECT CHARACTER STRING IN WHICH FIRST TWO CHARACTERS ARE ALPHABETIC CHARACTERS AND NUMBER FOLLOWS ALPHABETIC CHARACTERS AS CANDIDATE OF TRAILER ID / CONTAINER ID<br>SELECT CHARACTER STRING IN WHICH FOUR TWO CHARACTERS ARE ALPHABETIC CHARACTERS AND NUMBER FOLLOWS ALPHABETIC CHARACTERS AS CANDIDATE OF TRAILER ID / CONTAINER ID<br>SELECT CHARACTER STRING HAVING LARGE CHARACTER HEIGHT AS CANDIDATE OF TRAILER ID / CONTAINER ID<br>SELECT CHARACTER STRING WRITTEN IN VERTICAL WRITING AS CANDIDATE OF TRAILER ID / CONTAINER ID |
| MODE SELECTION | SELECT CHARACTER STRING BASED ON NUMBER OF TIMES OF RECOGNITION |
| REMAINING DATA SELECTION | ADOPT CHARACTER STRING BASED ON NUMBER OF CHARACTERS INCLUDED IN CHARACTER STRING |
| MASTER FILTER | DETERMINE WHETHER SIMILARITY TO MASTER DATA IS EQUAL TO OR LARGER TO PREDETERMINED THRESHOLD VALUE |

FIG. 7

| CANDIDATE OF TRAILER ID / CONTAINER ID | CORRECT ANSWER ID HAVING MAXIMUM SIMILARITY | SIMILARITY |
|---|---|---|
| UC15Y | UC15B6 | 0.67 |
| 2346 | UC15YRD2346 | 0.36 |
| UC15YARD2 | UC15YRD2346 | 0.64 |
| 7FHV188 | 831147 | 0.14 |
| 1D2346 | UC15YRD2346 | 0.55 |
| 5YA1D2 | YARD27 | 0.5 |

CHARACTER RECOGNITION DEVICE, CHARACTER RECOGNITION METHOD, CHARACTER RECOGNITION SYSTEM

CROSS-REFERENCE TO RELATED APPLICATIONS

This application is based on and claims priority under 35 USC 119 from Japanese Patent Application No. 2023-124762 filed on Jul. 31, 2023, the contents of which are incorporated herein by reference.

TECHNICAL FIELD

The present disclosure relates to a character recognition device, a character recognition method, and a character recognition system.

BACKGROUND ART

Patent Literature 1 discloses a license plate recognition device that detects a plurality of quadrangles of license plate region candidates from an input image and performs character recognition of character regions included in the license plate region candidates. The license plate recognition device selects a license plate region candidate to be output from the plurality of detected license plate region candidates, based on character recognition results and information on the quadrangles of the license plate region candidates. The license plate recognition device outputs information on the selected license plate region candidate.

CITATION LIST

Patent Literature

Patent Literature 1: JP2008-217347A

SUMMARY OF INVENTION

In recent years, a physical distribution using a trailer has flourished, and there is an increasing need to efficiently manage a location of each trailer. Here, the trailer means a towed vehicle towed by a towing vehicle (also referred to as a tractor). The trailer may load a container that stores various articles or the like. Since a trailer or a container generally has an identification (Hereinafter, referred to as "ID") related to identification of the trailer or the container, it is considered that the trailer or the container can be efficiently managed by recognizing this ID from a captured image of a vehicle or the like. However, the captured image may include various characters, and a character string successfully recognized is not necessarily the ID related to the identification of the trailer or the container. Therefore, when a trailer or a container which is an object to be imaged includes a plurality of character strings having various sizes, colors, and designs, there is a need to detect an ID related to identification of the trailer or the container from the plurality of character strings and identify the object to be imaged. Hereinafter, the ID related to the identification of the trailer is referred to as a "trailer ID", and the ID related to the identification of the container is referred to as a "container ID". In addition, hereinafter, the trailer ID and the container ID may be referred to as "the trailer ID/container ID" without being distinguished from each other.

In Patent Literature 1, a quadrangle that satisfies a predetermined condition is determined as a quadrangle of the license plate region candidate. However, since no unified standard is defined for the trailer ID at present, a position, a size, the number of characters, or the like are not defined. Therefore, even if the same technique as in Patent Literature 1 is applied, it is difficult to detect the trailer ID from various character strings written at any positions of the object to be imaged. In addition, there are a plurality of standards for the container ID, and it is difficult to detect the container ID from various character strings as in the trailer ID.

The present disclosure is made in view of the above situation in the related art, and an object thereof is to detect a character string considered to be a trailer ID or a container ID from a plurality of character strings.

The present disclosure provides a character recognition device including a recognizer that recognizes at least one character string from an image including a trailer captured by an imaging device; and a selector that selects character strings conforming to a specified notation format among the character strings recognized by the recognizer as candidates of a trailer ID/container ID, and that selects one of the candidates of the trailer ID/container ID, which has a similarity to master data of a previously held trailer ID/container ID equal to or larger than a predetermined threshold value as the trailer ID/container ID.

Further, the present disclosure provides a character recognition device including a recognizer that recognizes at least one character string from an image including a trailer captured by an imaging device; and a selector that selects a character string conforming to a specified notation format among the character strings recognized by the recognizer as a candidate of a trailer ID or a container ID.

Further, the present disclosure provides a character recognition device including a recognizer that recognizes at least one character string from an image including a trailer captured by an imaging device; and a selector that selects, as a trailer ID or a container ID, one of the character strings recognized by the recognizer, which has a similarity to master data of a previously held trailer ID or container ID equal to or larger than a predetermined threshold value.

Furthermore, the present disclosure provides a character recognition method including recognizing, by a character recognition device, at least one character string from an image including a trailer captured by an imaging device; and selecting, by the character recognition device, character strings conforming to a specified notation format among the recognized character strings as candidates of a trailer ID/container ID, and selecting one of the candidates of the trailer ID/container ID, which has a similarity to master data of a previously held trailer ID/container ID equal to or larger than a predetermined threshold value as the trailer ID/container ID.

Furthermore, the present disclosure provides a character recognition system including at least one imaging device that captures an image of a trailer; a recognizer that recognizes at least one character string from the image including the trailer captured by the imaging device; and a selector that selects character strings conforming to a specified notation format among the character strings recognized by the recognizer as candidates of a trailer ID/container ID, and that selects one of the candidates of the trailer ID/container ID, which has a similarity to master data of a previously held trailer ID/container ID equal to or larger than a predetermined threshold value as the trailer ID/container ID.

Any combination of the above constituent elements, and conversion of an expression of the present disclosure between a method, a device, a system, a storage medium, a computer program, and the like are also effective in an aspect of the present disclosure.

According to the present disclosure, a character string considered to be the trailer ID or the container ID can be detected from a plurality of character strings.

BRIEF DESCRIPTION OF DRAWINGS

FIG. 5 is a table illustrating selection logic of the trailer ID/container ID according to the present embodiment;

FIG. 7 is a table illustrating a similarity according to the present embodiment.

DESCRIPTION OF EMBODIMENTS

Hereinafter, an embodiment specifically disclosing a character recognition device, a character recognition method, and a character recognition system according to the present disclosure will be described in detail with reference to the drawings as appropriate. However, unnecessarily detailed descriptions may be omitted. For example, the detailed description of already well-known matters and the repeated description of substantially the same configuration may be omitted. This is to avoid unnecessary redundancy of the following description and to facilitate understanding of a person skilled in the art. The accompanying drawings and the following description are provided for those skilled in the art to fully understand the present disclosure, and are not intended to limit the subject matter described in the claims.

Figure 1:
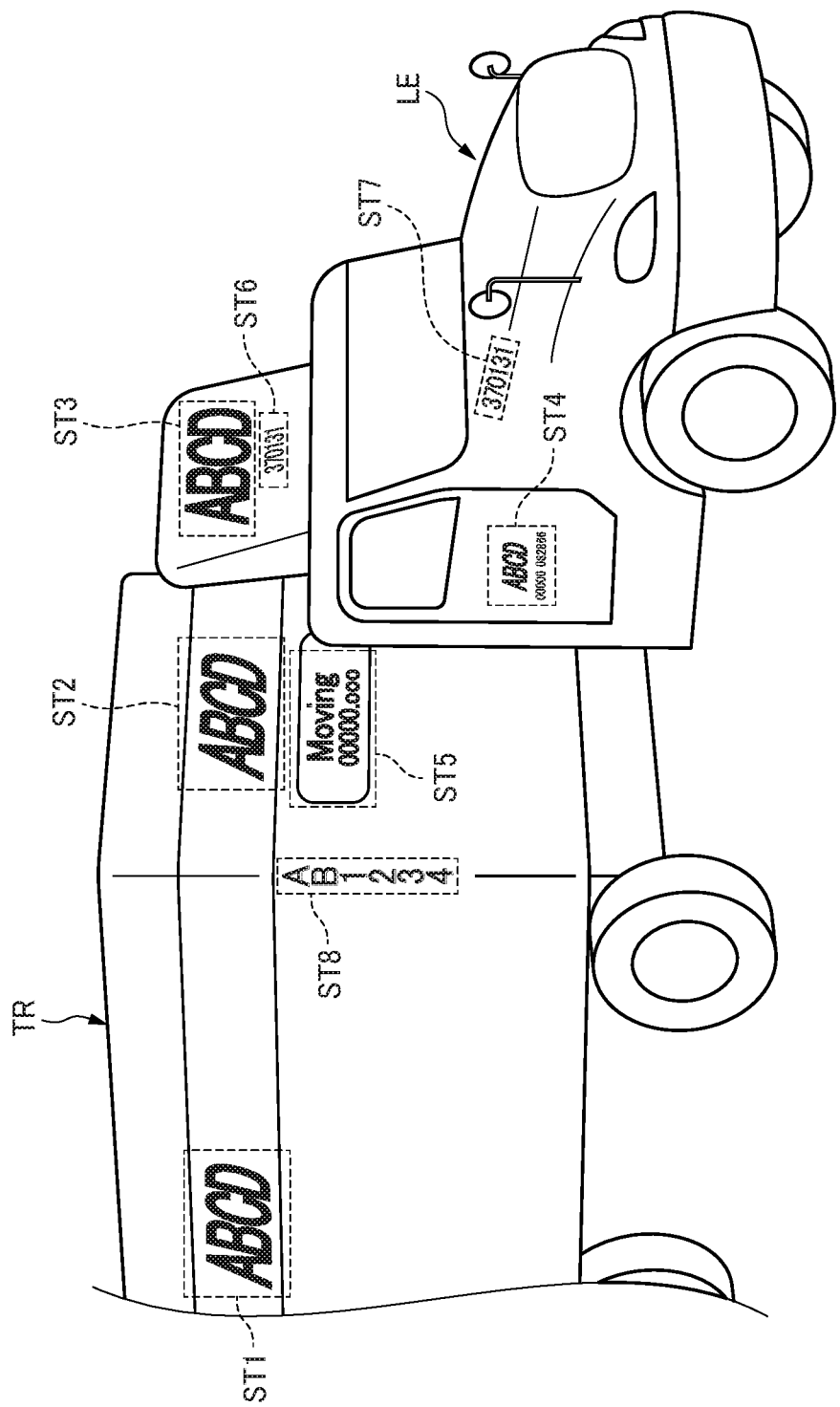
FIG. 1 is a schematic diagram showing an example of character strings written on a trailer.

Character strings written on a trailer TR will be described with reference to FIGS. 1 and 2. FIG. 1 is a schematic diagram showing an example of the character strings written on the trailer TR. FIG. 1 is a schematic diagram of the trailer TR as viewed from the front right side.

The trailer TR is an entire object towed by a tractor LE. Generally, a vehicle towed by a tractor is called a trailer. The trailer may include a set of a container that stores a cargo but does not have a mechanism for the movement such as wheels, and a carriage that loads the container. In addition, the trailer may be implemented by a vehicle in which a portion that stores a cargo and a mechanism for the movement are integrated with each other. When the tractor tows the set of the container and the carriage, only the carriage may be called a trailer. However, in the present specification, for convenience of description, both of the entire object to be towed by the tractor, that is, the set of the carriage and the container, and the vehicle including the portion that stores the cargo and the mechanism for the movement will be referred to as the trailer.

On the trailer TR, a trailer ID, and character strings related to a container ID, a company name, a telephone number, a number indicating a height of the trailer TR, a uniform resource locator (Hereinafter, referred to as "URL"), a word, a text, or the like are written. The character strings written on the trailer TR are not limited to the above examples.

Character strings ST1, ST2, ST3, and ST4 are character strings indicating a company name. The character strings ST1, ST2, ST3, and ST4 are character strings subjected to italic character decoration.

A character string ST5 is a character string indicated by an English word and is written below the character string ST2 indicating the company name.

Character strings ST6 and ST7 are character strings related to numbers for identifying the tractor LE.

A character string ST8 is a character string indicating the trailer ID. The character string ST8 is written in vertical writing in a corner of the trailer TR (that is, a boundary portion of surfaces of the trailer TR forming a housing, and a portion which is located on a side surface of the trailer TR and is elongated in a gravity direction).

Figure 2:
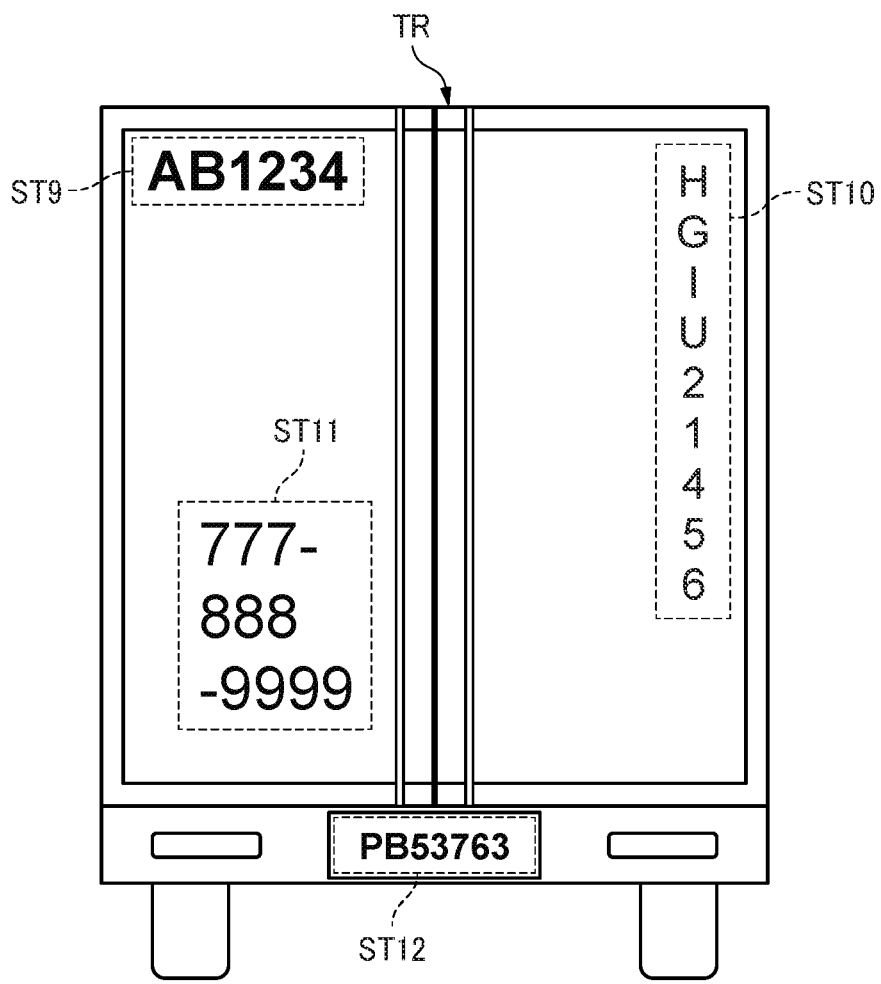
FIG. 2 is a schematic diagram showing an example of character strings written on the trailer.

FIG. 2 is a schematic diagram showing an example of character strings written on the trailer TR. FIG. 2 is a schematic diagram of the trailer TR as viewed from the rear.

A character string ST9 is a character string indicating the trailer ID. The character string ST9 having the same character string as the character string ST8 is written in horizontal writing.

A character string ST10 is a character string indicating the container ID. The character string ST10 is a character string indicated by alphabetic characters and numbers. In the present specification, in order to simplify the description, an example is described in which both the trailer ID and the container ID are written on one trailer, however, only one of the trailer ID and the container ID may be written on the trailer.

A character string ST11 is a character string indicating the telephone number. The character string ST11 is a character string indicated by numbers.

A character string ST12 is a character string indicating numbers of a number plate (license plate).

Thus, a plurality of character strings are written on the trailer TR.

In recent years, with an increase in a physical distribution, there is an increasing need to efficiently manage a large number of trailers TR. For example, it is necessary to identify each trailer TR at a place (for example, a departure point, a transit point, and a destination point) at which a plurality of trailers TR gather. However, since the trailer TR has the plurality of character strings (for example, character strings ST1, ST2, ST5, and ST8), there is a problem that it is difficult to detect the trailer ID/container ID from the plurality of character strings.

Figure 3:
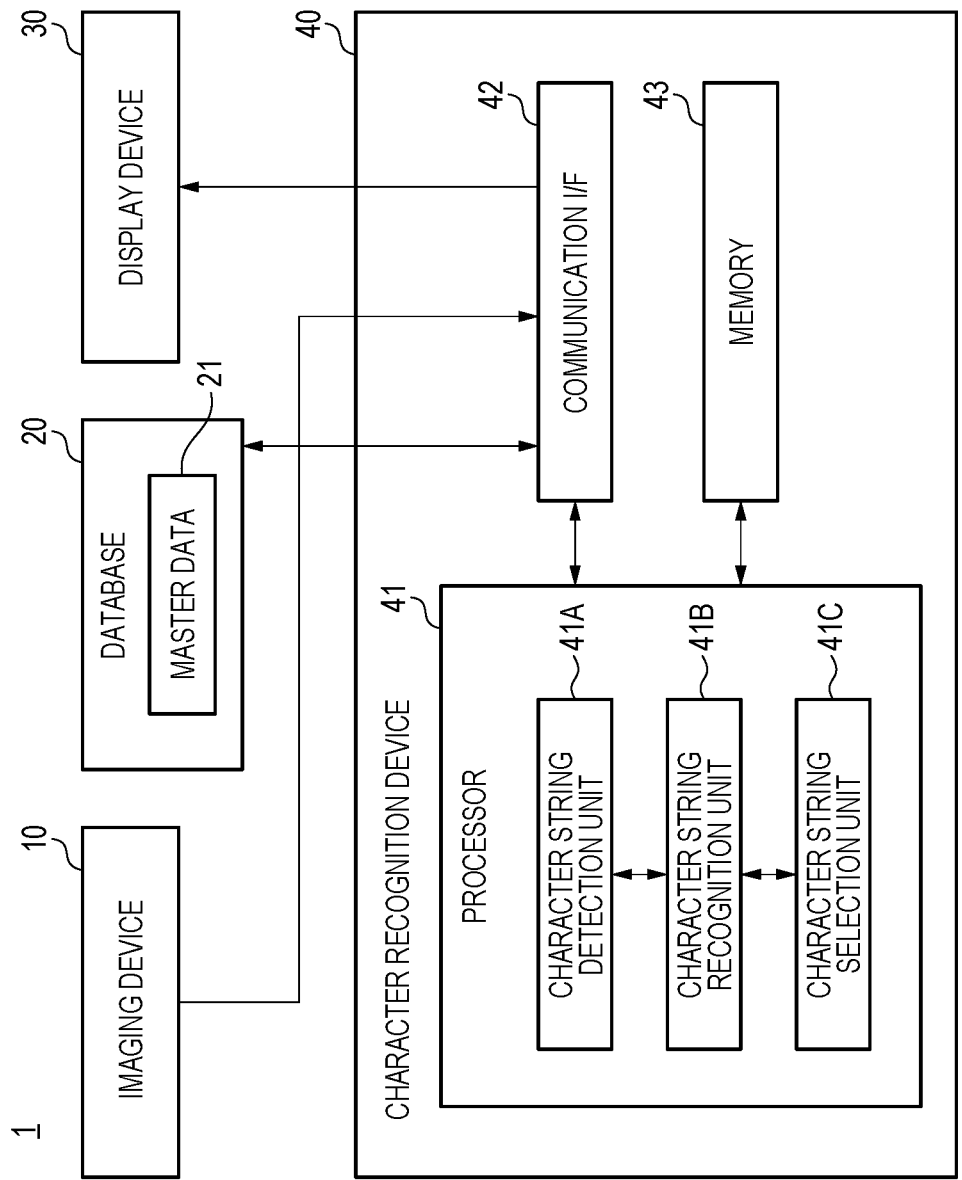
FIG. 3 is a block diagram showing a configuration example of a character recognition system according to the present embodiment.

Next, a block diagram of a character recognition system 1 according to the present embodiment will be described with reference to FIG. 3. FIG. 3 is the block diagram showing a configuration example of the character recognition system 1 according to the present embodiment.

The character recognition system 1 includes at least an imaging device 10, a database 20, a display device 30, and a character recognition device 40.

The imaging device 10 is a device that captures an image of a trailer. The imaging device 10 is disposed, for example, at an entrance and exit of a region (hereinafter, also referred to as a "yard") at which loading and unloading or transship of a cargo carried by a tractor and a trailer is performed or the trailer towed by the tractor or a container mounted on the trailer is changed, and captures an image of the trailer and the tractor which enter and exit the yard. The imaging device 10 includes at least a lens (not shown) as an optical element and an image sensor (not shown). The lens receives light reflected from an object within an angle of view of a region imaged by the imaging device 10 to form an optical image of the object on a light receiving surface (in other words, an imaging surface) of the image sensor. The image sensor is, for example, a solid-state imaging element such as a charged coupled device (Hereinafter, referred to as "CCD") or a complementary metal oxide semiconductor (Hereinafter, referred to as "CMOS").

The image sensor converts the optical image formed on the imaging surface via the lens into an electric signal at every predetermined time (for example, ⅓₀ (second)). For example, when the predetermined time is ⅓₀ (second), a frame rate of the imaging device 10 is 30 fps. The imaging device 10 may generate image data (video data) by performing predetermined signal processing on the electric signal at every predetermined time described above. The image data is a still image, and the video data is a moving image. The imaging device 10 outputs the image data (video data) to the character recognition device 40. Hereinafter, the image data and the video data are referred to as captured images. The example of FIG. 3 shows one imaging device 10, and the character recognition system 1 may include a plurality of imaging devices. When the character recognition system includes a plurality of imaging devices, the plurality of imaging devices are preferably arranged so as to be able to capture images of the trailer from a plurality of angles.

The database 20 is implemented by a storage medium (for example, a flash memory, a hard disk drive (Hereinafter, referred to as "HDD"), and a solid state drive (Hereinafter, referred to as "SSD")). The database 20 holds the trailer ID/container ID. The trailer ID/container ID held in the database 20 may be, for example, a trailer ID/container ID written on a trailer scheduled to arrive at a departure point, a transit point, a destination point, or the like. In addition, the trailer ID/container ID held in the database 20 may be, for example, a trailer ID/container ID identified in the past. The trailer ID/container ID held in the database 20 may be registered in advance by a user, or the trailer ID/container ID selected by the character recognition device 40 may be registered in the character recognition device 40. the trailer ID/container ID held in the database 20 are collectively handled as master data 21. Hereinafter, the trailer ID/container ID held as the master data 21 may be referred to as a correct answer ID. The database 20 may be incorporated into the character recognition device 40.

The display device 30 displays a result of selection of a character string by the character recognition device 40. The display device 30 is a terminal including a display unit, such as a personal computer (hereinafter referred to as "PC"), a tablet, or a mobile phone. The display device 30 may be integrated with the character recognition device 40. There may be a plurality of display devices 30. When the character recognition system 1 includes the plurality of display devices 30, the display devices 30 may have different forms and users. For example, the result of the selection of the character string may be displayed on a PC or the like located in an office and a tablet or the like owned by a worker. In this case, each of the display devices 30 may change the details of information to be displayed according to a performance of each of the display devices 30 or a work required by the user of each of the display devices 30. In addition, in the present embodiment, the display device 30 may be omitted. This is because when the character recognition device 40 stores the selected trailer ID/container ID or transfers the selected trailer ID/container ID to another system, it is not always necessary for the user to visually confirm the result of the selection of the character string.

The character recognition device 40 includes at least a processor 41, a communication I/F 42, and a memory 43.

The character recognition device 40 is, for example, a computing device such as a PC. In the present specification, an example in which the character recognition device 40 is implemented by one computing device will be described, and the character recognition device 40 may implement functions in cooperation with a plurality of devices, or may be implemented by a cloud.

The processor 41 is implemented using, for example, a central processing unit (Hereinafter, referred to as "CPU"), a digital signal processor (Hereinafter, referred to as "DSP"), or a field programmable gate array (Hereinafter, referred to as "FPGA"). The processor 41 functions as a controller that controls the overall operation of the character recognition device 40. The processor 41 performs control processing for controlling operations of the units of the character recognition device 40, data input and output processing with each of the units of the character recognition device 40, data calculation processing, and data storage processing. The processor 41 operates according to a program stored in the memory 43. The processor 41 uses the memory 43 during operation and temporarily stores data generated or acquired by the processor 41 in the memory 43. The processor 41 implements respective functions of a character string detection unit 41A, a character string recognition unit 41B, and a character string selection unit 41C by using the program and the data stored in the memory 43.

The character string detection unit 41A as an example of a detection unit detects character strings from a captured image acquired from the imaging device 10. The character string detection unit 41A detects the character strings using a known technique such as machine learning.

The character string recognition unit 41B as an example of a recognition unit performs character recognition of the character strings detected by the character string detection unit 41A. The character string recognition unit 41B performs the character recognition of the character strings using a known technique such as optical character recognition (Hereinafter, referred to as "OCR").

In the description of the present embodiment, the character recognition is performed by the OCR.

The character string selection unit 41C as an example of a selection unit selects the trailer ID/container ID from one or more character strings recognized by the character string recognition unit 41B. The character string selection unit 41C selects the trailer ID/container ID by applying various types of processing and various filters to be described later. The details of various types of processing and various filters for selection will be described later. The character string selection unit 41C outputs the selected trailer ID/container ID to the communication I/F 42.

The communication I/F 42 is an interface circuit for the character recognition device 40 to perform wireless or wired communication with the imaging device 10, the database 20, and the display device 30. Here, I/F represents an interface. The communication I/F 42 may communicate via a network. Examples of a communication method performed by the communication I/F 42 include mobile communication such as a wide area network (Hereinafter, referred to as "WAN"), a local area network (Hereinafter, referred to as "LAN"), a long term evolution (Hereinafter, referred to as "LTE"), 4G, and 5G, power line communication, short-range wireless communication (for example, Bluetooth (registered trademark) communication), or communication for a mobile phone.

The memory 43 includes, for example, a random access memory (Hereinafter, referred to as "RAM") and a random access memory (Hereinafter, referred to as "ROM"), and temporarily holds a program necessary for the operation of the character recognition device 40 and data generated during the operation. The RAM is, for example, a work memory used during the operation of the character recognition device 40. The ROM stores and holds in advance, for example, a program for controlling the character recognition device 40.

Figure 4:
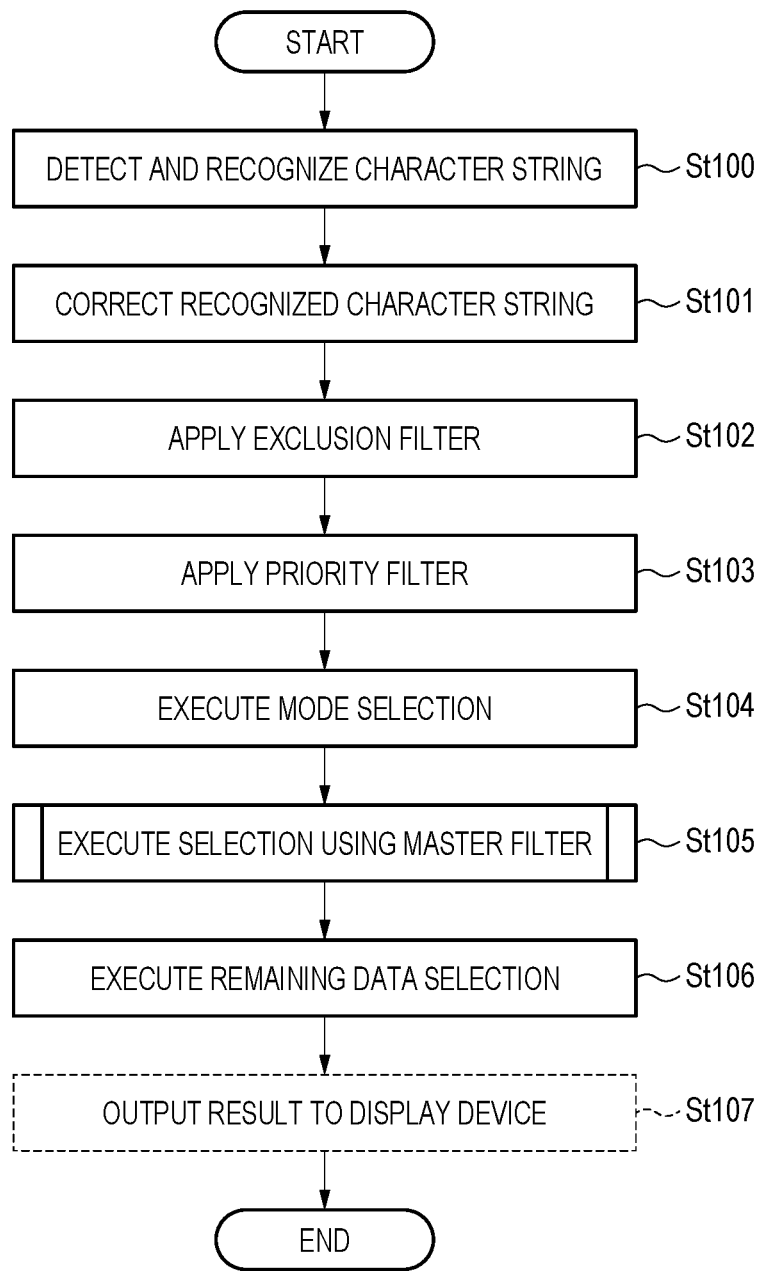
FIG. 4 is a flowchart of processing of selecting a trailer ID/container ID according to the present embodiment.

Next, a flowchart of processing executed by the character recognition device 40 will be described with reference to FIG. 4. FIG. 4 is the flowchart of the processing executed by the character recognition device 40. Each processing in the flowchart according to FIG. 4 is executed by the processor 41. At the start of the flowchart, the processor 41 acquires a captured image from the imaging device 10. For convenience of description, it is assumed that the captured image includes a plurality of character strings.

When the captured image acquired from the imaging device 10 includes an image considered to be a character string, the character string detection unit 41A detects at least one character string from the captured image, and the character string recognition unit 41B performs character recognition of the character string (step St100). For convenience of description, it is assumed that there are a plurality of recognized character strings. The character detection unit 41A may detect a region of a trailer or a container from the captured image and detect a character string from the range. The captured image may include a character string unrelated to the trailer ID/container ID, such as a signage, or may include a shadow or the like seen as a character string. Therefore, the character detection unit 41A limits a region in which a character string is detected to a region estimated to be a trailer or a container, thereby preventing the character string unrelated to the trailer ID/container ID, the shadow seen as a character string, and the like from being detected as candidates of the trailer ID/container ID. A function of detecting the region of the trailer or the container from the captured image can be implemented by using pattern matching or a trained model obtained by performing machine learning on the image of the trailer or the container.

The character string recognition unit 41B corrects the character strings recognized in the processing of step St100 (step St101). The details of the correction will be described later.

The character string selection unit 41C applies an exclusion filter to the character string after correction in the processing of step St101 and the character string before correction (step St102). Accordingly, a character string having specific characteristics is excluded (deleted) from the plurality of character strings recognized in step St100. The details of the exclusion filter will be described later. For convenience of description, it is assumed that there are a plurality of character strings after application of the exclusion filter.

The character string selection unit 41C applies a priority filter to the character strings not excluded in the processing of step St102 (step St103). Accordingly, the character string selection unit 41C selects character strings conforming to a specified notation format among the recognized character strings as candidates of the trailer ID/container ID. The details of the priority filter will be described later. For convenience of description, it is assumed that there are a plurality of candidates of the trailer ID/container ID.

The character string selection unit 41C executes mode selection on the character strings selected in the processing of step St103, and further selects the candidates of the trailer ID/container ID (step St104). The details of the mode selection will be described later. For convenience of description, it is assumed that there are a plurality of candidates of the trailer ID/container ID after the mode selection.

The character string selection unit 41C performs selection using a master filter (step St105). The processing of step St105 will be described later with reference to a flowchart shown in FIG. 6. For convenience of description, it is assumed that there are a plurality of candidates of the trailer ID/container ID after the selection using the master filter.

The character string selection unit 41C executes remaining data selection on the character strings selected in the processing of step St105, and finally selects one trailer ID/container ID (step St106). Accordingly, one trailer ID/container ID related to the identification of the imaged trailer is selected. The details of the remaining data selection will be described later.

The processor 41 outputs a result of step St106 to the display device 30 (step St107). The processing of step St107 may be omitted.

Next, each processing and each filter appearing in the flowchart of FIG. 4 will be described with reference to FIG. 5. FIG. 5 is a table illustrating selection logic of the trailer ID/container ID according to the present embodiment.

The details of the correction processing executed on the character strings by the character string recognition unit 41B in step St101 of the flowchart of FIG. 4 will be described. The correction processing is processing of correcting a character string recognized from the captured image to a format that is likely to be handled in each subsequent processing. As the correction processing, for example, it is conceivable to exclude characters that are likely to be erroneously recognized, such as a hyphen, or replace characters that are likely to be erroneously recognized, such as "1" and "I".

When the recognized character string includes a hyphen, the character string recognition unit 41B deletes the hyphen by the correction processing. The hyphen is a character that is likely to be erroneously recognized due to dirt or the like on the trailer. In addition, in a system such as a management system using the trailer ID/container ID, it is rare that the trailer ID/container ID including a hyphen and the trailer ID/container ID not including a hyphen are handled separately. Therefore, in the present specification, it is assumed that the trailer ID/container ID are managed in a format not including a hyphen. However, in another system using the recognized trailer ID/container ID, it may be better not to delete a hyphen such as a case in which a trailer ID/container ID in a format including a hyphen is used. Therefore, whether to execute the processing of deleting a hyphen may be switched by the user.

When the character string recognition unit 41B recognizes a character or a number at an end of the captured image, the character string recognition unit 41B deletes the character or the number by the correction processing. This is because the character may be cut off at the end of the captured image, and an accurate recognition result may not be obtained. For example, when only a left half of "8" is included in the captured image, "8" may be erroneously recognized as "E". In addition, when only a right half of "8" is included in the captured image, "8" may be erroneously recognized as "3". A width (in other words, region) of the end of the captured image may be changed according to designation of the user. When a character or a number at the end of the captured image is recognized, the entire character string including the character or the number may be deleted. This is because, as described above, there is a possibility that a character recognized from the end of the captured image is erroneously recognized, and thus, even if a character string including such a character is set as the candidate of the trailer ID/container ID, an accurate trailer ID/container ID may not be obtained.

When the recognized character string includes a character or a number that is likely to be erroneously recognized, the character string recognition unit 41B converts the character or the number by the correction processing. For example, when the recognized character string includes the number "1", the character string recognition unit 41B determines that the number "1" is likely to be erroneously recognized as an alphabetic character "I", and converts the number "1" into the alphabetic character "I". A criterion for determining whether the erroneous recognition is likely to occur may be set in advance by the user, for example. When a part of the recognized character string that is specified as an alphabetic character portion in a notation format to be described later is a specified number, the character string recognition unit 41B may convert the number into the specified alphabetic character. When a part of the recognized character string that is specified as a number portion in the notation format to be described later is a specified alphabetic character, the character string recognition unit 41B may convert the alphabetic character into the specified number. When the conversion processing is performed, the processor 41 leaves the character string before conversion as it is, and adds the character string after conversion as a newly recognized character string. That is, the character string recognition unit 41B leaves both the character string before conversion and the character string after conversion as candidates of the trailer ID/container ID. Accordingly, the character string selection unit 41C sets the character string after conversion and the character string before conversion as targets for selection of the trailer ID/container ID by the character string selection unit 41C. This is because, when the trailer ID/container ID are written in an unknown notation format, the character string after conversion conforming to a known notation format may not be a correct trailer ID/container ID.

The details of the exclusion filter applied to the character string by the character string selection unit 41C in step St102 of the flowchart of FIG. 4 will be described. The exclusion filter is a filter for excluding a character string having a pattern assumed not to be the trailer ID/container ID from the candidates. The exclusion filter excludes, for example, a character string in which a recognition result by the OCR itself is unreliable, a character string including a character string having a low possibility of being included in the trailer ID/container ID, and a character string having an extremely small number of characters. As an example of the character string having a low possibility of being included in the trailer ID/container ID, for example, a character string or the like regulated by a standard different from that of the trailer ID/container ID is considered.

The character string selection unit 41C applies an exclusion filter to exclude a character string having an OCR reliability score equal to or less than a predetermined threshold value among the recognized character strings. The reliability score is a score representing an accuracy of the character string recognized by the OCR. The threshold value may be set in advance by the user, for example. The character string selection unit 41C applies the exclusion filter to exclude character strings consisting of all alphabetic characters among the recognized character strings from the candidates of the trailer ID/container ID. The character string selection unit 41C applies the exclusion filter to exclude character strings prefixed with specific alphabetic characters among the recognized character strings from the candidates of the trailer ID/container ID. In the present specification, the prefix means a first alphabetic character string of the character string. For example, a prefix of a character string "AAA1234" is "AAA". For example, when it is known in advance that a character string prefixed with "USDOT", "KYU", or the like cannot be used as the trailer ID/container ID, the user can set the character string with the prefix to be excluded. The candidates of the trailer ID/container ID are excluded based on the prefix, and this is because it is known that the character string prefixed with the specific alphabetic characters is not the trailer ID/container ID. For example, it is known that the character string prefixed with "USDOT" is a notation format for a number used for inspection by the United States Department of Transportation. However, a configuration in which candidates of the trailer ID/container ID are excluded based on the prefix is an example, and the candidates of the trailer ID/container ID may be excluded based on other character strings. For example, when it is known that a specific number or a character string included in the second half of a character string is not used in the trailer ID/container ID, an exclusion filter may be implemented to exclude candidates in which the number or the character string appears.

The character string selection unit 41C applies the exclusion filter to exclude character strings, which are less than a predetermined number of characters, among the recognized character strings from the candidates of the trailer ID/container ID. The predetermined number of characters may be, for example, three characters. This is because the character string that is less than three characters often indicates a dimension of the container, and is often not suitable as the candidate of the trailer ID/container ID. In addition, the character string selection unit 41C applies the exclusion filter to exclude, from the candidates of the trailer ID/container ID, character strings in which characters, figures, or the like that are not alphabetic characters or numbers are erroneously recognized among the recognized character strings. This is because the trailer ID/container ID often include a character string that can be read without misunderstanding in a plurality of countries, and there is a low possibility that characters, figures, or the like such as hiragana that are used in a limited area are used.

The details of the priority filter applied to the character string by the character string selection unit 41C in step St103 of the flowchart of FIG. 4 will be described. The priority filter is a filter for selecting a character string having a high possibility of being the trailer ID/container ID. The priority filter selects, for example, a character string conforming to the notation format known as the trailer ID/container ID.

The character string selection unit 41C applies the priority filter to select character strings conforming to the specified notation format among the recognized character strings as the candidates of the trailer ID/container ID. The notation format specifies, for example, an alphabetic character portion and a number portion in the character string. For example, the character string selection unit 41C applies the priority filter to select a character string in which first two characters of the character string are alphabetic characters and a number follows the alphabetic characters as a candidate of the trailer ID/container ID. For example, the character string selection unit 41C applies the priority filter to select a character string in which first four characters of the character string are alphabetic characters and a number follows the alphabetic characters as a candidate of the trailer ID/container ID. In the present embodiment, it is assumed that the trailer ID and the container ID are managed without being distinguished from each other, and thus the character string selection unit 41C selects the character string as the candidate of the trailer ID/container ID both when the character string conforms to a notation format of the trailer ID and when the character string conforms to a notation format of the container ID. However, when it is necessary to distinguish and handle the trailer ID and the container ID, the character strings may be handled as candidates of IDs conforming to the respective notation formats. For example, a character string in which first two characters of the character string are alphabetic characters and a number follows the alphabetic characters may be handled as a candidate of the trailer ID, and a character string in which first four characters of the character string are alphabetic characters and a number follows the alphabetic characters may be selected as a candidate of the container ID.

When the trailer ID and the container ID are handled in a distinguished manner, it may be distinguished whether the character string is the trailer ID or the container ID by using a discriminator created using machine learning. The discriminator can be created by, for example, performing machine learning on a large number of character strings that are distinguished between examples of a character string indicating a trailer ID and examples of a character string indicating a container ID. Since various machine learning methods are known, the detailed description is omitted in the present embodiment. As the character string indicating the trailer ID and the character string indicating the container ID to be machine learned, a result of the user manually inputting the trailer ID or the container ID to a system for managing trailers or the like may be used, or a selection result based on the above notation format may be used.

When the trailer ID and the container ID are handled in a distinguished manner, it may be distinguished whether the character string is the trailer ID or the container ID by using an estimation result of a type of vehicle towed by the tractor. For example, when the vehicle towed by the tractor is a set of a container and a carriage, the detected character string is handled as the container ID. On the other hand, when the vehicle towed by the tractor is a vehicle in which a portion that stores a cargo and wheels or the like are integrated with each other, the detected character string is handled as the trailer ID. For example, the discriminator created using the machine learning is used for the estimation of the type of vehicle towed by the tractor. More specifically, it is conceivable to perform machine learning by distinguishing an image of the container from an image of the vehicle in which the portion that stores the cargo and the wheels or the like are integrated with each other. Since various machine learning methods are known, the detailed description is omitted in the present embodiment. In this case, in order to narrow down a region to be processed by the discriminator, processing of detecting a tractor from an image may be performed in advance, and a region of the vehicle towed by the tractor may be estimated based on the detection result. The processing of detecting the tractor from the image can be implemented by using, for example, a trained model obtained by performing machine learning on an image of a tractor. When the vehicle towed by the tractor is a set of the container and the carriage, it may be determined which of the container ID and the trailer ID the character string is handled, depending on which of the container and the carriage the character string is written. For example, when a character string is written on a container, the character string may be handled as a container ID, and when a character string is written on a portion of a carriage, the character string may be handled as a trailer ID.

As described in the description of the correction, the character string recognition unit 41B may execute the correction processing based on the notation format. For example, when a character string is specified in the notation format in which first four characters of the character string are alphabetic characters and a number follows the alphabetic characters, the character string recognition unit 41B may execute the correction processing based on the notation format. For example, when a character string "HG1U21456" is recognized, the character string recognition unit 41B converts "1" in "HG1U" into "I" based on the specification that the first four characters of the character string are the alphabetic characters. In addition, the character string recognition unit 41B does not convert "1" in "21456" based on the specification that the number follows the alphabetic characters. Accordingly, a character string "HGIU21456" is newly added to the recognized character string.

The character string selection unit 41C may apply the priority filter to select a character string having a character height larger than a predetermined height among the recognized character strings as a candidate of the trailer ID/container ID. Here, the character height means a length of a character in a vertical direction. In general, the larger a character height, the higher a possibility that a character is larger, and the larger the character, the higher a possibility that the character is accurately recognized by the OCR. Therefore, by selecting a character string having a large character height as a candidate of the trailer ID/container ID, the character string having a high possibility that characters are accurately recognized can be selected as a candidate. In addition, when there are a plurality of candidates of trailer ID and the container ID as a result of applying the priority filter, a character string having a larger character height may be adopted as a candidate having a higher possibility of being the trailer ID/container ID than other candidates. The reason why a height is evaluated instead of a size of the character is that a width of the character may not be accurately detected because the character strings of the trailer ID/container ID are often written by characters vertically extended or the captured image in the present embodiment is captured from the front or rear in a traveling direction of the trailer. When the width of the character can be accurately detected, such as when the trailer is imaged from another angle, the size of the character may be used instead of the height of the character.

The character string selection unit 41C may apply the priority filter to select a character string written in vertical writing among the recognized character strings as a candidate of the trailer ID/container ID. This is because, in general, there is a high possibility that a character string other than the trailer ID/container ID, such as a telephone number or a URL is written in horizontal writing, and there is a high possibility that the character string written in vertical writing is the candidate of the trailer ID/container ID.

The candidate of the trailer ID/container ID selected by the character string selection unit 41C to apply the priority filter is one of the candidate of the trailer ID and the candidate of the container ID. This is because if one of the trailer ID and the container ID can be identified, it is possible to uniquely manage the trailer or the container that enters and exits the yard, and in many cases, only one of the trailer ID and the container ID is written on the trailer. The character string selection unit 41C may determine whether a character string to be finally selected is the trailer ID or the container ID at the time of applying the priority filter. In the processing after the application of the priority filter, that is, in the processing after step St104 of the flowchart of FIG. 4, one of the candidate of the trailer ID and the candidate of the container ID may be a processing object.

The details of the mode selection executed by the character string selection unit 41C on the character strings in step St104 of the flowchart of FIG. 4 will be described. The mode selection is processing of selecting a character string recognized at the highest frequency, among the candidates of the trailer ID/container ID, as the trailer ID/container ID. The imaging device 10 is set to an angle of view suitable for imaging of the trailer ID/container ID, and thus there is a high possibility that the correct trailer ID and container ID are recognized as the same character string from images captured at a plurality of imaging timings. However, when a character string is erroneously recognized, a recognition result is likely to be unstable, and thus the possibility that the same character string is recognized from the images captured at the plurality of imaging timings is lowered. That is, when the same character string is recognized from the images captured at the plurality of imaging timings, there is a high possibility that the character string is the correct trailer ID and container ID. Therefore, in the mode selection, this property is used to select the correct trailer ID and container ID.

The character string recognized by the character string recognition unit 41B is included in the image captured by the imaging device 10. When the imaging device 10 captures an image of a moving trailer, for example, the imaging device 10 captures images of the trailer from the front, the side, and the rear. At this time, the same character string may be included in the image captured from the front of the trailer, the image captured from the side of the trailer, and the image captured from the rear of the trailer by the imaging device 10. Alternatively, one captured image may include a plurality of the same character strings. In this case, the character string recognition unit 41B recognizes the character string a plurality of times.

The character recognition system 1 may include a plurality of imaging devices including the imaging device 10. The plurality of imaging devices may be arranged so as to be able to capture images of the trailer from a plurality of angles, and the character string recognition unit 41B may recognize the character string from the plurality of images of the trailer captured from the plurality of angles. In this case, one or more captured images may include a plurality of the same character strings. Therefore, the character string recognition unit 41B may recognize the character string a plurality of times.

The character string selection unit 41C selects, by the mode selection, the trailer ID/container ID from the candidates of the trailer ID/container ID based on the number of times the candidates of the trailer ID/container ID are recognized from one or more captured images. In other words, the character string selection unit 41C selects the trailer ID/container ID based on a level of a frequency of appearance of the character string, which is the candidate of the trailer ID/container ID, in one or more images captured by one or more imaging devices. Hereinafter, the number of times the character string is recognized by the character string recognition unit 41B may be referred to as a count number.

For example, the character string selection unit 41C selects a candidate of the trailer ID/container ID having the largest count number as the trailer ID/container ID. For example, the character string selection unit 41C selects a candidate of the trailer ID/container ID in which the count number is equal to or larger than a predetermined threshold value as the trailer ID/container ID. The threshold value may be set in advance by the user. For example, when there are a plurality of candidates of the trailer ID/container ID having the same count number, the character string selection unit 41C may preferentially select a character string having a large number of characters. In addition, when the mode selection is executed, the character string selection unit 41C may calculate a count number including the candidate of the trailer ID/container ID which were not selected by applying any criterion of the priority filter. This is because, for example, when only character strings written in vertical writing are selected by applying the priority filter, character strings written in horizontal writing are excluded from the candidates of the trailer ID/container ID, and the correct trailer ID and container ID written in horizontal writing may not remain in the candidates.

The character string selection unit 41C can narrow down the trailer ID/container ID to one from the candidates of the trailer ID/container ID by the mode selection. When the trailer ID/container ID could not be narrowed down to one by the mode selection, the character string selection unit 41C executes selection using the "master filter" and/or the "remaining data selection" to be described later. As a specific example of a case in which the trailer ID/container ID are not narrowed down to one by the mode selection, a case in which there are a plurality of candidates of the trailer ID/container ID having the same count number is considered. In addition, when there are a plurality of candidates of the trailer ID/container ID having a small difference in the count number by the mode selection, the selection using the "master filter" and/or the "remaining data selection" to be described later may also be executed. This is because, when the difference in the count number is small, there is no obvious superiority and inferiority in the candidates of the trailer ID/container ID from the viewpoint of the mode selection, and thus a result itself of narrowing down to one may be incorrect. In addition, when the count number of the mode selection is small, the selection using the "master filter" and/or the "remaining data selection" to be described later may also be executed. This is because, in this case, information serving as the basis of a mode evaluation is insufficient, and a result of the mode selection itself is not sufficiently reliable.

In the above description, in order to simplify the description, an example is described in which a candidate having the largest count number is selected as the trailer ID/container ID, however, a frequency of recognition of the trailer ID/container ID may be evaluated based on a count number within a predetermined time, and a candidate having the highest frequency may be selected as the trailer ID/container ID.

The details of the remaining data selection executed by the character string selection unit 41C on the character strings in step St106 of the flowchart of FIG. 4 will be described. The "remaining data selection" is processing of selecting the trailer ID/container ID when the trailer ID/container ID are not narrowed down even after the processing up to step St105. In the remaining data selection, for example, the trailer ID/container ID are selected based on the number of characters. This is because, a large number of trailers or containers are handled, and thus there is a high possibility that the trailer ID/container ID used to distinguish the trailers or the containers are relatively long character strings to avoid duplication.

The character string selection unit 41C selects a character string having the largest number of characters among the candidates of the trailer ID/container ID as the trailer ID/container ID by the remaining data selection. The character string selection unit 41C executes the remaining data selection when the trailer ID/container ID are not narrowed down to one by other processing and selection using a filter. The remaining data selection has less basis for reliable results than the processing up to step St105. Therefore, for example, the character string selection unit 41C may output information indicating that the trailer ID/container ID cannot be confirmed as remaining data processing in the remaining data selection. In this case, the character string having the largest number of characters may be output together as the trailer ID/container ID, or the trailer ID/container ID itself may not be output. In this way, it is possible to inform the user or an external system that the trailer ID/container ID with high certainty cannot be selected, and thus it is possible to prompt the user to confirm the trailer ID/container ID by visual observation or the like.

The details of the master filter applied to the character string by the character string selection unit 41C in step St105 of the flowchart of FIG. 4 will be described. The master filter is a filter that determines whether the candidate is the trailer ID/container ID based on whether the candidate of the trailer ID/container ID is similar to the master data 21 (correct answer ID) held as a character string known to be the trailer ID/container ID. For example, the master data 21 is a character string recorded as the trailer ID/container ID in the past. The master data 21 is not necessarily recognized by the OCR, and may be a character string manually input by a worker at a yard or the like at which recognition of the trailer ID/container ID is not automated. In addition, when the information or the like on the trailer ID/container ID scheduled to enter and exit the yard can be acquired from a host system that manages the entire logistics, the information may be used as the master data 21. The master data 21 does not necessarily have to include information completely matching the trailer ID/container ID written on the trailer itself that enters and exits the yard. This is because the trailer ID/container ID tend to have a similar notation format to some extent, and thus it is possible to estimate a possibility of being the trailer ID/container ID, even if the candidate does not completely match the master data 21, by evaluating a similarity between the candidate of the trailer ID/container ID and the master data 21. For example, when the trailer ID/container ID include a combination of a transportation company name and numbers, the transportation company name may be common even if the numbers are different between the master data 21 and the candidate. In this case, the similarity is highly evaluated even if the candidate of the trailer ID/container ID does not completely match the master data 21, and thus it can be determined that there is a high possibility that the candidate of the trailer ID/container ID is the trailer ID/container ID.

The character string selection unit 41C selects, as the trailer ID/container ID, a candidate of the trailer ID/container ID in which a similarity between the candidate of the trailer ID/container ID and the master data 21 of a previously held trailer ID and container ID is equal to or larger than a predetermined threshold value, among the candidates of the trailer ID/container ID. Here, the similarity is a numerical value indicating how similar the character strings (for example, the trailer ID and a trailer ID of the master data 21) are. The similarity is calculated based on, for example, a Levenshtein distance between the character strings. However, the similarity of the character strings may be evaluated based on another method. For example, it is considered that the evaluation is based on the number of matching characters or a ratio of the matching characters in the entire character string. The details of the selection processing using the master filter will be described later with reference to FIG. 6.

The character string selection unit 41C can narrow down the trailer ID/container ID to one from the candidates of the trailer ID/container ID by executing the selection using the master filter. When the trailer ID/container ID are not narrowed down to one by executing the selection using the master filter, the character string selection unit 41C executes selection based on the above "remaining data selection".

Figure 6:
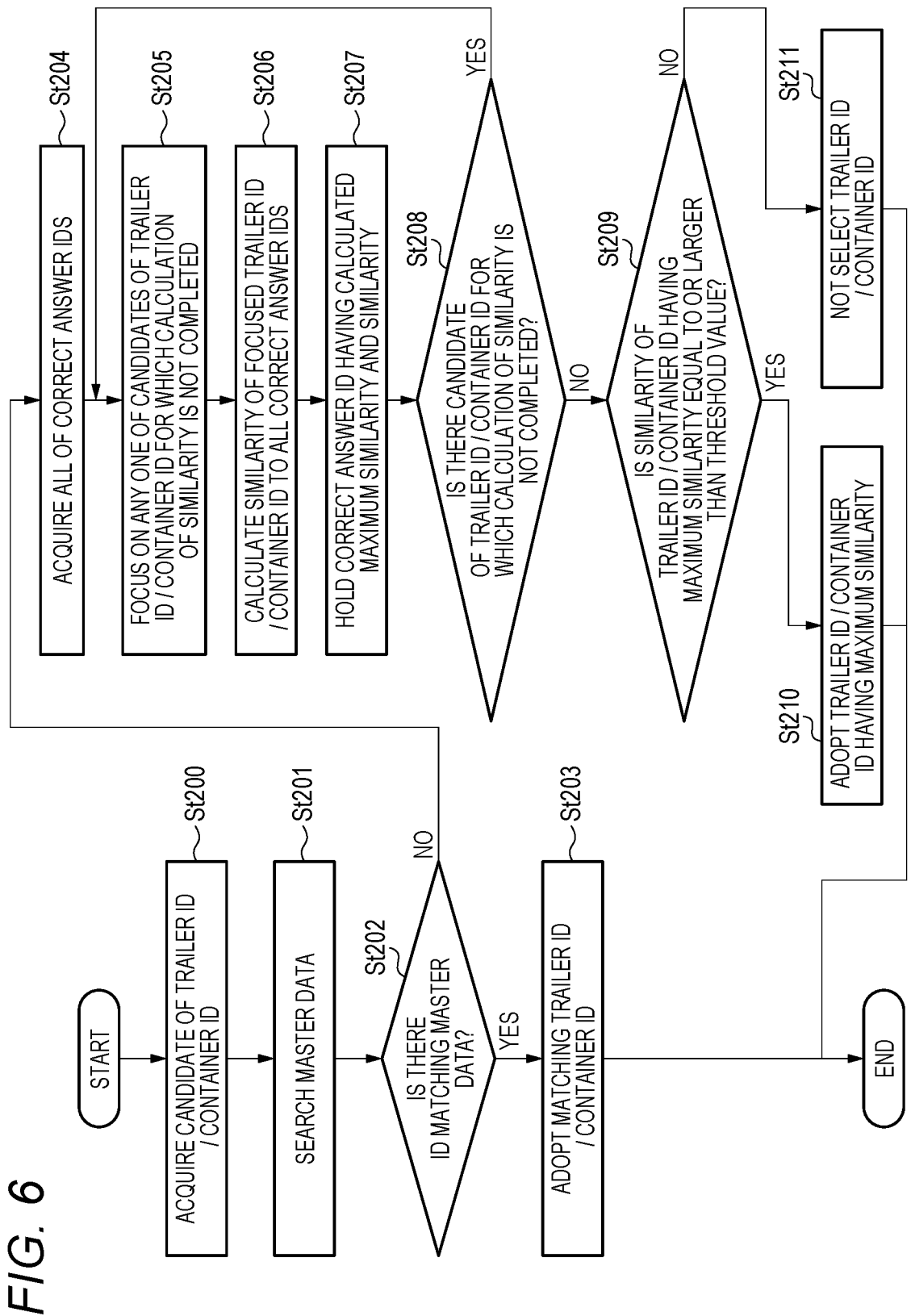
FIG. 6 is a flowchart of selection processing using a master filter according to the present embodiment.

Next, processing related to the selection using the master filter of the candidates of the trailer ID/container ID will be described with reference to FIG. 6. FIG. 6 is a flowchart of the selection processing using the master filter according to the present embodiment. Each processing according to the flowchart of FIG. 6 is executed by the processor 41. At the start of the flowchart of FIG. 6, the processing of step St104 in the flowchart of FIG. 4 is completed. In this case, the description will be given assuming that a plurality of candidates of the trailer ID/container ID remain.

The character string selection unit 41C acquires a candidate of the trailer ID/container ID (step St200). Here, the term "acquire" means focusing on handling in each processing to be described later.

The character string selection unit 41C searches the master data 21 in order to search for the trailer ID/container ID matching any one of the candidates of the trailer ID/container ID acquired in step St200 (step St201).

When the trailer ID/container ID matching any one of the candidates of the trailer ID/container ID acquired in step St200 is held as the master data 21 (step St202, YES), the character string selection unit 41C adopts (selects) the trailer ID/container ID (step St203). Then, the character string selection unit 41C ends the processing flow.

When the trailer ID/container ID matching any one of the candidates of the trailer ID/container ID acquired in step St200 is not held as the master data 21 (step St202, NO), the character string selection unit 41C acquires all of the trailer IDs/container IDs, which are referred to as correct answer IDs and are previously held as the master data 21 (step St204).

The character string selection unit 41C focuses on any one of the candidates of the trailer ID/container ID for which the calculation of a similarity to the correct answer ID is not completed (step St205).

The character string selection unit 41C calculates the similarity of the candidate of the trailer ID/container ID focused in step St205 to each of all the correct answer IDs acquired in step St204 (step St206). For example, when there are 100 correct answer IDs acquired in step St204, the character string selection unit 41C calculates a similarity of the candidate of the trailer ID/container ID to each of the 100 correct answer IDs. In this case, the character string selection unit 41C calculates 100 similarities.

The character string selection unit 41C holds the correct answer ID having the maximum similarity to the candidate of the trailer ID/container ID calculated in step St206 among the correct answer IDs acquired in step St204 and the similarity (step St207). The holding means that the character string selection unit 41C associates and stores the candidate of the trailer ID/container ID, the correct answer ID having the maximum similarity to the candidate of the trailer ID/container ID, and the similarity.

When there remains a candidate of the trailer ID/container ID for which the calculation of the similarity to the correct answer ID is not completed (step St208, YES), the processing of the processor 41 returns to step St205 and is repeated.

Accordingly, the similarity of each of all the candidates of the trailer ID/container ID to each of all the correct answer IDs is calculated. For example, when there are ten candidates of the trailer ID/container ID, the character string selection unit 41C repeats a series of processing of step St205, step St206, and step St207 ten times. At this time, the character string selection unit 41C holds the correct answer ID having the maximum similarity to each of the candidates of the ten trailer ID and container ID, and the similarity.

A specific example will be described with reference to FIG. 7. FIG. 7 is a table illustrating a similarity according to the present embodiment. In the example of FIG. 7, candidates of the trailer ID/container ID are six of "UC15Y", "2346", "UC15YARD2", "7FHV188", "1D2346", and "5YARD". The number of correct answer IDs may be, for example, 10 or 100. In the example of FIG. 7, the processor 41 calculates a similarity of the candidate "UC15Y" of the trailer ID/container ID to each of all the correct answer IDs, and holds a correct answer ID "UC15B6" calculated to have the maximum similarity and a similarity 0.67 at that time. Similarly, the character string selection unit 41C holds a correct answer ID having the maximum similarity to each of the other five candidates of the trailer ID/container ID and the similarity at that time.

When there remains the candidate of the trailer ID/container ID for which the calculation of the similarity to the correct answer ID is not completed (step St208, NO), the character string selection unit 41C determines whether the maximum similarity among the similarities held in step St207 is equal to or larger than the predetermined threshold value (step St209). For example, when there are ten candidates of the trailer ID/container ID, ten similarities are also held. At this time, the character string selection unit 41C determines whether the maximum similarity among the ten similarities is equal to or larger than the predetermined threshold value. The threshold value may be set in advance by the user, for example.

In the example of FIG. 7, the character string selection unit 41C determines whether 0.67, which is the maximum similarity among the six held similarities, is equal to or larger than the predetermined threshold value.

When the maximum similarity among the similarities held in step St207 is equal to or larger than the predetermined threshold value (step St209, YES), the character string selection unit 41C adopts the candidate of the trailer ID/container ID associated with the maximum similarity (step St210). Then, the processing flow ends.

In the example of FIG. 7, the maximum similarity is 0.67. For example, when the predetermined threshold value is 0.6, the character string selection unit 41C determines that the maximum similarity is equal to or larger than the predetermined threshold value. At this time, the character string selection unit 41C adopts the candidate "UC15Y" of the trailer ID/container ID associated with the similarity (0.67).

When the maximum similarity among the similarities held in step St207 is not equal to or larger than the predetermined threshold value (step St209, NO), the character string selection unit 41C does not select the trailer ID/container ID in the processing flow (step St211). Then, the processing flow ends.

For example, in the example of FIG. 7, when the predetermined threshold value is 0.7, the maximum similarity of 0.67 is smaller than the threshold value. At this time, the character string selection unit 41C does not select the trailer ID/container ID by the master filter, and ends the processing flow.

Other Modifications

In the above embodiment, the example is described in which each processing in the flowchart of FIG. 4 is executed by the processor 41 of the character recognition device 40. However, the present disclosure is not limited thereto, and for example, each processing in the flowchart of FIG. 4 may be distributed to a plurality of PCs. For example, the PC located in the departure point, the transit point, the destination point, or the like of the trailer may execute the processing up to step St102 in the flowchart of FIG. 4, and the processing of step St103 and the subsequent steps may be executed on a cloud in a server such as a company. For example, each processing in the flowchart of FIG. 4 may be aggregated and executed on the cloud. In addition, the database 20 stored in the character recognition device 40 may be a database on the cloud. In particular, when the correct answer IDs are collected from recognition results or the like in a plurality of yards, implementing the database 20 as a database on a cloud connected to a plurality of character recognition devices 40 facilitates management of data. In addition, processing of outputting the result to a display device (for example, the display device 30) may be replaced with processing of transmitting a selection result of the trailer ID/container ID to the external system, or may be replaced with processing of outputting the result to the display device and the external system. This is because the selected trailer ID and container ID can also be used for management of a trailer, a container, or a cargo or the like, and thus can also be used by a system for optimizing a logistics network, an operator of such a system, and the like.

In the above embodiment, the example is described in which the character recognition device 40 executes various types of processing such as character recognition from the image captured by the imaging device 10. However, the present disclosure is not limited thereto, for example, an ID recognition processor or the like having a character recognition function or the like may be incorporated into the imaging device 10, and the imaging device 10 may execute various types of processing such as the character recognition and the selection of the trailer ID/container ID.

In the above embodiment, the example is described in which the character string selection unit 41C determines whether the character string to be finally selected is the trailer ID or the container ID at the time of applying the priority filter. However, the present disclosure is not limited thereto, and for example, the character string selection unit 41C can obtain both a result when the trailer ID is selected and a result when the container ID is selected. That is, the selection of the trailer ID and the selection of the container ID may be simultaneously executed. For example, it may be sufficient for a user such as an administrator of a trailer to select either the trailer ID or the container ID for management of the trailer or the like. However, even in such a case, the user can obtain the selection result of the trailer ID and the selection result of the container ID.

In the above embodiment, the example is described in which the character string selection unit 41C executes the selection using the priority filter, followed by the mode selection, the selection using the master filter, and the remaining data selection in this order. However, the present disclosure is not limited thereto, and if the trailer ID/container ID can be narrowed down to one by the mode selection, the character string selection unit 41C may end the selection processing without executing the selection using the master filter and the remaining data selection. Similarly, if the trailer ID/container ID can be narrowed down to one by the selection using the master filter, the character string selection unit 41C may end the selection processing without executing the remaining data selection. In addition, for example, the character string selection unit 41C may change the order of execution of the selection using the master filter, the mode selection, and the remaining data selection after the selection using the priority filter. In addition, the order of the processing after the character string is detected may be freely changed. For example, it is considered that step St101 is moved immediately before step St105, and the corrected character string is applied only to the selection using the master filter. The order of execution may be set in advance by the user, for example. For example, the character string selection unit 41C may select one trailer ID/container ID by executing the remaining data selection after the selection using the priority filter. In addition, in the above embodiment, any processing executed by the character string selection unit 41C may be omitted, or other processing may be added.

In the above embodiment, the example is described in which the character string selection unit 41C applies the priority filter to the character string and selects the candidate of the trailer ID/container ID. At this time, the number of candidates of the trailer ID/container ID selected by the character string selection unit 41C may be only one. That is, the character string selection unit 41C may select one trailer ID/container ID by the priority filter.

In the above embodiment, the example is described in which the character string selection unit 41C executes selection based on the notation format and selection based on the master data 21. However, the present disclosure is not limited thereto, and the character string selection unit 41C may execute either the selection based on the notation format or the selection based on the master data 21. For example, the character string selection unit 41C may select the trailer ID/container ID by executing the selection using the priority filter, the mode selection, and the remaining data selection after applying the exclusion filter to the character string.

For example, the processor 41 may select the trailer ID/container ID by executing the selection using the master filter, the mode selection, and the remaining data selection after applying the exclusion filter to the character string. As the number of trailer IDs/container IDs held as the master data 21 increases, an accuracy of the selection using the master filter increases. Therefore, depending on the number of trailer IDs/container IDs held as the master data 21, the trailer ID/container ID can be selected by executing the selection using the master filter without executing each processing such as the mode selection and the remaining data selection. However, in consideration of the possibility that similar character strings (in other words, character strings for which the same similarity can be calculated) are recognized, it is preferred to execute the mode selection.

In the above embodiment, the selection result of the trailer ID/container ID to be output is a selection result by any one of the processing of the mode selection, the selection using the master filter, and the remaining data selection. However, when the number of candidates of the trailer ID/container ID is narrowed down to one as a result of the selection using the exclusion filter or the priority filter, the candidate may be selected and output as the trailer ID/container ID. However, there is a high possibility that the trailer ID/container ID not subjected to the mode selection are the erroneously recognized trailer ID/container ID, and thus an accuracy of the selected trailer ID and container ID subjected to the mode selection is higher than that of the trailer ID/container ID not subjected to the mode selection.

In the above embodiment, the example is described in which the trailer ID/container ID for identifying the trailer or the container are recognized and notified. However, the idea of the above embodiment can also be applied when recognizing or notifying another ID of a moving body that enters and exits the yard. For example, the idea of the above embodiment can also be applied to recognition of an ID for identifying a tractor and recognition of an ID of another vehicle such as a truck or a passenger car. In addition, it may be possible to set an ID of which type of moving body that enters and exits the yard is to be recognized depending on a request of the user.

Summary of Present Disclosure

The following techniques are disclosed by the above description of the embodiment.
Technique 1
A character recognition device (for example, character recognition device 40) according to the present embodiment includes: a recognition unit (for example, character string recognition unit 41B) configured to recognize at least one character string from an image including a trailer captured by an imaging device (for example, imaging device 10); and a selection unit (for example, character string selection unit 41C) configured to select character strings conforming to a specified notation format among the character strings recognized by the recognition unit as candidates of a trailer ID or a container ID, and select one of the candidates of the trailer ID or the container ID, which has a similarity to master data (for example, master data 21) of a previously held trailer ID or container ID equal to or larger than a predetermined threshold value as the trailer ID or the container ID.

Accordingly, the character recognition device according to the present embodiment can detect a character string considered to be the trailer ID or the container ID from a plurality of character strings written on the trailer based on the specified notation format. In addition, even when it is difficult to detect a character string based on the notation format, the character recognition device can detect the character string considered to be the trailer ID or the container ID based on a known trailer ID or container ID. That is, the character recognition device can detect the trailer ID or the container ID with high accuracy from the plurality of character strings written on the trailer.
Technique 2
In the character recognition device according to Technique 1, the notation format may specify an alphabetic character portion and a number portion in the character string.

Accordingly, when the character string of the trailer ID or the container ID includes alphabetic characters and numbers, the character recognition device according to the present embodiment can detect the trailer ID/container ID based on the notation format that specifies the alphabetic character portion and the number portion of the character string.
Technique 3
In the character recognition device according to Technique 1 or 2, the recognition unit may convert a part of the recognized character string that is specified as an alphabetic character portion in the notation format into a specified alphabetic character when the part of the recognized character string is a specified number, and convert a part of the recognized character string that is specified as a number portion in the notation format into a specified number when the part of the recognized character string is a specified alphabetic character.

Accordingly, when the recognized character string includes characters that are likely to be erroneously recognized, the character recognition device according to the present embodiment can convert the characters based on the notation format. Accordingly, it is possible to convert only a necessary part in the character string and reduce erroneous recognition of the character string.

Technique 4

In the character recognition device according to Technique 3, the selection unit may set the character string after conversion and the character string before conversion as targets to be selected by the selection unit.

Accordingly, the character recognition device according to the present embodiment can set the character string after conversion conforming to the specified notation format as the target to be selected of the trailer ID or the container ID, but also can set the character string before conversion as the target to be selected of the trailer ID or the container ID. For example, even when a character string that does not match the specified notation format is written as the trailer ID or the container ID in the trailer, the character recognition device can select the character string as the trailer ID or the container ID.

Technique 5

In the character recognition device according to any one of Techniques 1 to 4, the selection unit may select the trailer ID or the container ID from the candidates of the trailer ID or the container ID based on the number of times the candidates of the trailer ID or the container ID are recognized from one or more captured images by the recognition unit.

Accordingly, when there are the plurality of candidates of the trailer ID or the container ID, the character recognition device according to the present embodiment can select a character string that appears more often in the captured image and is recognized more often as the trailer ID or the container ID.

Technique 6

In the character recognition device according to any one of Techniques 1 to 5, the selection unit may exclude character strings consisting of all alphabetic characters among the character strings recognized by the recognition unit from the candidates of the trailer ID or the container ID.

Accordingly, the character recognition device according to the present embodiment can exclude the character strings consisting of all alphabetic characters, which are considered to be neither the trailer ID nor the container ID, from the candidates of the trailer ID or the container ID.

Technique 7

In the character recognition device according to any one of Techniques 1 to 6, the selection unit may exclude character strings, which are less than a predetermined number of characters, among the character strings recognized by the recognition unit from the candidates of the trailer ID or the container ID.

Accordingly, the character recognition device according to the present embodiment can exclude the character strings, which are considered to be neither the trailer ID nor the container ID and do not satisfy the predetermined number of characters, from the candidates of the trailer ID or the container ID.

Technique 8

In the character recognition device according to any one of Techniques 1 to 7, the selection unit may calculate the similarity based on a Levenshtein distance between the candidate of the trailer ID or the container ID and the master data.

Accordingly, the character recognition device according to the present embodiment can calculate the similarity based on the Levenshtein distance between the candidate of the trailer ID or the container ID and the trailer ID or the container ID held as the master data.

Technique 9

In the character recognition device according to any one of Techniques 1 to 8, the selection unit may select a character string having the largest number of characters among the candidates of the trailer ID or the container ID as the trailer ID or the container ID.

Accordingly, the character recognition device according to the present embodiment can select the character string having a large number of characters as the trailer ID/container ID, for example, when the candidates of the trailer ID/container ID cannot be narrowed into one.

Although the present embodiment has been described above with reference to the drawings, it is needless to say that the present disclosure is not limited to such examples. It is apparent to a person skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, constituent elements in the present embodiment may be freely combined without departing from the gist of the invention.

INDUSTRIAL APPLICABILITY

The present disclosure is useful as a character recognition device, a character recognition method, and a character recognition system.

What is claimed is:

1. A character recognition device comprising a processor configured to implement:
   a recognizer that recognizes at least one character string from a plurality of character strings in an image including a trailer captured by an imaging device; and
   a selector that selects the at least one character string from among the plurality of character strings that conforms to a specified notation format as candidates of a trailer ID/container ID and that selects one of the candidates of the trailer ID/container ID as the trailer ID/container ID based on the at least one character string having a similarity to a master data of a previously held trailer ID/container ID equal to or larger than a predetermined threshold value.

2. The character recognition device according to claim 1, wherein
   the notation format specifies an alphabetic character portion and a number portion in the at least one character string.

3. The character recognition device according to claim 2, wherein
   the recognizer converts a part of the recognized at least one character string that is specified as an alphabetic character portion in the notation format into a specified alphabetic character when the part of the recognized at least one character string is recognized as a specified number, and the recognizer converts a part of the recognized at least one character string that is specified as a number portion in the notation format into a specified number when the part of the recognized at least one character string is recognized as a specified alphabetic character.

4. The character recognition device according to claim 3, wherein the selector sets a character string after conversion and a character string before conversion as targets to be selected by the selector.

5. The character recognition device according to claim 1, wherein the selector selects the trailer ID/container ID from the candidates of the trailer ID/container ID based on a number of times a same candidate of the trailer ID/container ID is recognized from images captured at a plurality of different timings by the recognizer.

6. The character recognition device according to claim 1, wherein the selector excludes character strings consisting of all alphabetic characters among the at least one character string recognized by the recognizer from the candidates of the trailer ID/container ID.

7. The character recognition device according to claim 1, wherein the selector excludes character strings, which are less than a predetermined number of characters, among the at least one character string recognized by the recognizer from the candidates of the trailer ID/container ID.

8. The character recognition device according to claim 1, wherein the selector calculates the similarity based on a Levenshtein distance between the selected one of the candidates of the trailer ID/container ID and the master data.

9. The character recognition device according to claim 1, wherein the selector selects a character string having the largest number of characters among the candidates of the trailer ID/container ID as the trailer ID/container ID.

10. A character recognition method comprising:

recognizing, by a character recognition device, at least one character string from a plurality of character strings in an image including a trailer captured by an imaging device; and selecting, by the character recognition device, the at least one character string from among the plurality of character strings that conforms to a specified notation format as candidates of a trailer ID/container ID, and selecting one of the candidates of the trailer ID/container ID as the trailer ID/container ID based on the at least one character string having a similarity to a master data of a previously held trailer ID/container ID equal to or larger than a predetermined threshold value.

11. A character recognition system comprising:

at least one imaging device that captures an image of a trailer; and a processor configured to implement:

a recognizer that recognizes at least one character string from a plurality of character strings in the image of the trailer captured by the at least one imaging device; and a selector that selects the at least one character string from among the plurality of character strings that conforms to a specified notation format as candidates of a trailer ID/container ID, and that selects one of the candidates of the trailer ID/container ID as the trailer ID/container ID based on the at least one character string having a similarity to a master data of a previously held trailer ID/container ID equal to or larger than a predetermined threshold value.

* * * * *